(12) United States Patent
Lee

(10) Patent No.: US 8,233,015 B2
(45) Date of Patent: Jul. 31, 2012

(54) DISPLAY APPARATUS AND METHOD OF MANUFACTURING THE SAME

(75) Inventor: Seung-Yeop Lee, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 366 days.

(21) Appl. No.: 12/481,907

(22) Filed: Jun. 10, 2009

(65) Prior Publication Data

US 2009/0310288 A1 Dec. 17, 2009

(30) Foreign Application Priority Data

Jun. 12, 2008 (KR) ........................ 10-2008-0055364

(51) Int. Cl.
*G02F 1/333* (2006.01)
*H05K 5/00* (2006.01)

(52) U.S. Cl. .............. 345/905; 361/679.21; 361/679.26; 349/58

(58) Field of Classification Search .............. 361/679.21
See application file for complete search history.

(56) References Cited

U.S. PATENT DOCUMENTS

| | | | |
|---|---|---|---|
| 6,002,582 A * | 12/1999 | Yeager et al. | 361/679.21 |
| 6,816,212 B2 * | 11/2004 | Lin et al. | 349/58 |
| 6,867,827 B2 * | 3/2005 | Cha et al. | 349/65 |
| 7,081,880 B2 * | 7/2006 | Morishita et al. | 345/102 |
| 7,190,424 B2 * | 3/2007 | Lee et al. | 349/58 |
| 7,226,201 B1 * | 6/2007 | Li et al. | 362/633 |
| 7,697,273 B2 * | 4/2010 | Kawano | 361/679.21 |
| 2004/0179150 A1 * | 9/2004 | Lai | 349/58 |
| 2005/0073624 A1 * | 4/2005 | Lee et al. | 349/58 |
| 2005/0231658 A1 * | 10/2005 | Chieh | 349/56 |
| 2007/0120878 A1 * | 5/2007 | Hsiao et al. | 345/905 |
| 2008/0239757 A1 * | 10/2008 | Cha et al. | 362/633 |

FOREIGN PATENT DOCUMENTS

| | | |
|---|---|---|
| JP | 2001035233 | 2/2001 |
| KR | 1020060122277 | 11/2006 |
| KR | 1020070097739 | 10/2007 |

* cited by examiner

*Primary Examiner* — Anthony Q Edwards
(74) *Attorney, Agent, or Firm* — Cantor Colburn LLP

(57) ABSTRACT

A display apparatus includes first and second frames in which a display panel is seated and optical sheets are received, and a method of manufacturing the display apparatus. The display apparatus includes a display panel displaying an image, a light source supplying light to the display panel, a first frame supporting the display panel and having the light source positioned therein, and a second frame combined with the first frame, wherein the second frame includes a cover portion that receives the light source, and a support portion, which extends from the cover portion along sidewalls of the first frame, where the support portion combines with the first frame, and includes an opening, the opening formed opposite to and facing the cover portion.

12 Claims, 14 Drawing Sheets

DISPLAY APPARATUS AND METHOD OF MANUFACTURING THE SAME

This application claims priority to Korean Patent Application No. 10-2008-0055364, filed on Jun. 12, 2008, and all the benefits accruing therefrom under 35 U.S.C. §119, the contents of which in its entirety are herein incorporated by reference.

BACKGROUND OF THE INVENTION

1. Field of the Invention

This disclosure relates to a display apparatus and a method of manufacturing the same.

2. Description of the Related Art

As modern society rapidly changes toward an information-oriented society, market demand for a slimmer and lighter panel display has increased. Cathode Ray Tube ("CRT") displays are neither slim nor lightweight. Accordingly, Flat Panel Display ("FDP") devices, such as Plasma Display Panels ("PDPs"), Plasma Address Liquid Crystal display panels ("PALCs"), Liquid Crystal Displays ("LCDs"), and Organic Light Emitting Diodes ("OLEDs"), are the subject of increased commercial attention.

In particular, a flat panel display ("FPD"), which has advantages such as low power consumption, reduced weight, and a slim profile, are commercially used in various industrial applications, including computers, electronic devices, and information communications equipment, for example. FPDs include an LCD panel assembly having a LCD panel for displaying an image, a backlight assembly that includes a lamp for emitting light, a light guide plate for guiding the light to the LCD panel, and receiving containers for receiving the LCD panel and the backlight assembly.

There exists a need to reduce the overall thickness and weight of a display apparatus, including reduction of the volume of the frames and receiving containers which form the external shape of the display apparatus. A major concern is to maintain the strength of the entire structure while reducing the overall weight and volume of the frames and receiving containers.

BRIEF SUMMARY OF THE INVENTION

The above described and other drawbacks are alleviated by a lightweight display apparatus capable having a thin profile, by simplifying structures of first and second frames in which a display panel is seated and optical sheets are received.

The disclosure also provides a method of manufacturing a lightweight display apparatus and having a thin profile, by simplifying structures of first and second frames in which a display panel is seated and optical sheets are received.

The above and other aspects of the disclosure will be described in or be apparent from the following description of the exemplary embodiments.

Disclosed herein is a display apparatus including a display panel displaying an image, a light source supplying light to the display panel, a first frame supporting the display panel, the first frame comprising a sidewall and having the light source disposed therein, and a second frame combined with the first frame, wherein the second frame includes a cover portion and a support portion, the cover portion receives the light source, and the support portion extends from the cover portion along the sidewall of the first frame, the cover portion is combined with the first frame, and having an opening disposed opposite to and facing the cover portion.

According to another aspect, there is provided a display apparatus including a display panel displaying an image, a first frame including a sidewall, a frame portion which extends to an interior area formed by the sidewall and in which the display panel is disposed, a fastening protrusion disposed at an edge of the sidewall, and a light guide portion integrally disposed with the frame portion, the light guide portion guides the light emitted from the light source to the display panel, and a second frame combined with the first frame, wherein the second frame has one end bent and at least partially overlapping the display panel.

According to still another aspect, there is provided a method of manufacturing a display apparatus, the method including receiving a light source in a first frame, and combining a second frame with the first frame, the second frame including a cover portion which receives the light source, and a support portion which protrudes from the cover portion along the sidewall of the first frame, and has an opening disposed opposite to and facing the cover portion.

BRIEF DESCRIPTION OF THE DRAWINGS

The above and other aspects, features and advantages of the disclosed embodiments will become more apparent by describing in further detail exemplary embodiments thereof with reference to the attached drawings in which.

DETAILED DESCRIPTION OF THE INVENTION

Figure 1:
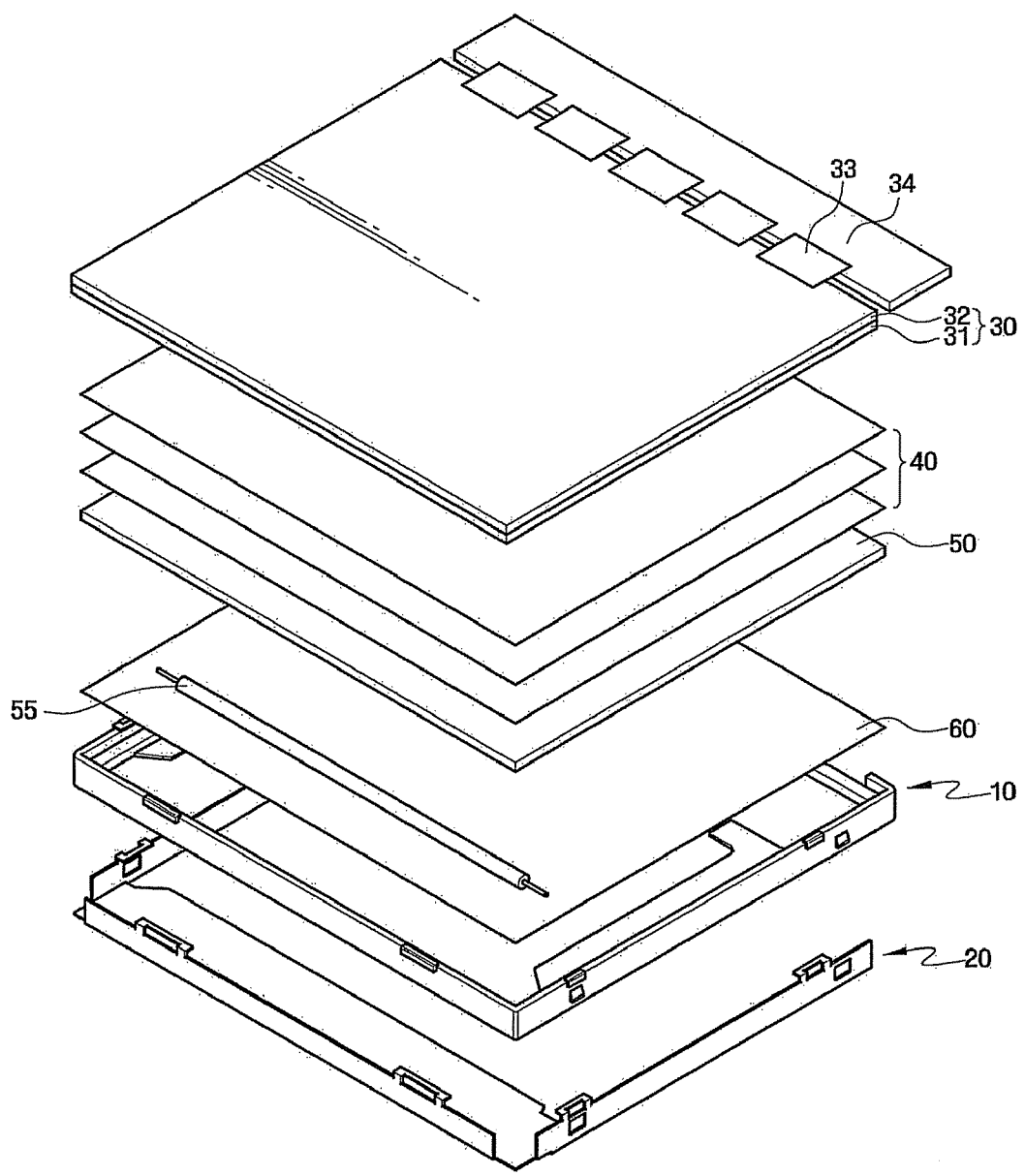
FIG. 1 is an exploded perspective view showing an exemplary embodiment of a display apparatus.

Advantages and features of the embodiments, and methods of accomplishing the same, may be understood more readily by reference to the following detailed description and the accompanying drawings. The disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the disclosure will only be defined by the appended claims. Like reference numerals refer to like elements throughout the specification.

The terms "the", "a" and "an" do not denote a limitation of quantity, but rather denote the presence of at least one of the referenced item. The suffix "(s)" as used herein is intended to include both the singular and the plural of the term that it modifies, thereby including at least one of that term (e.g., the edge(s) includes at least one edge).

Figure 3A:
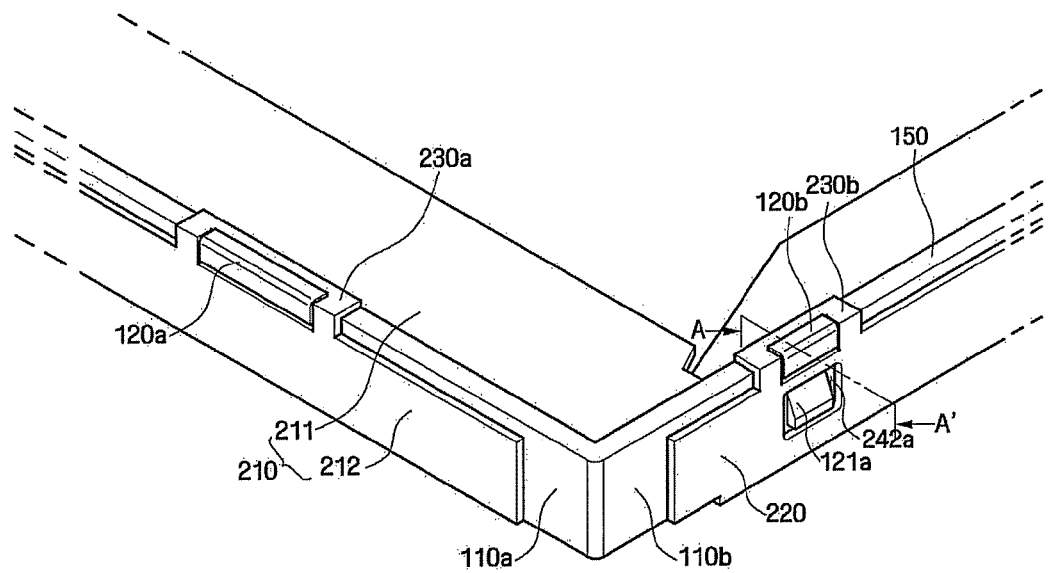
FIG. 3A is an enlarged perspective view showing an exemplary embodiment of a region "A" shown in FIG. 2.
Figure 3B:
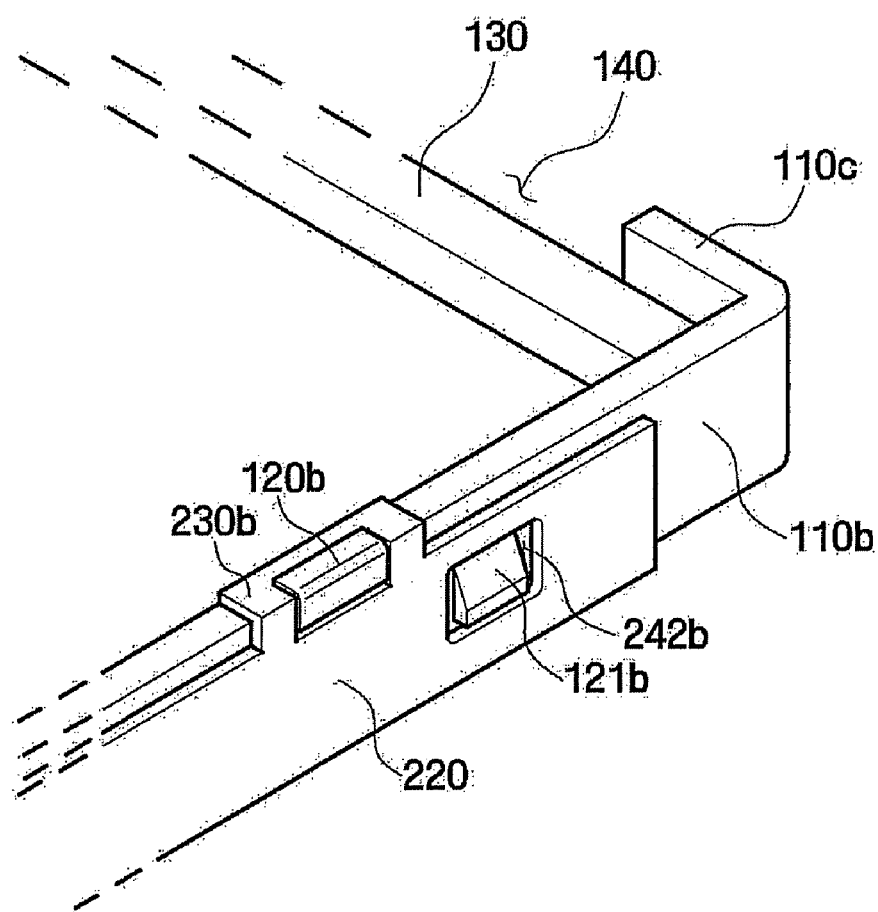
FIG. 3B is an enlarged perspective view showing an exemplary embodiment of a region "B" shown in FIG. 2.
Figure 4A:
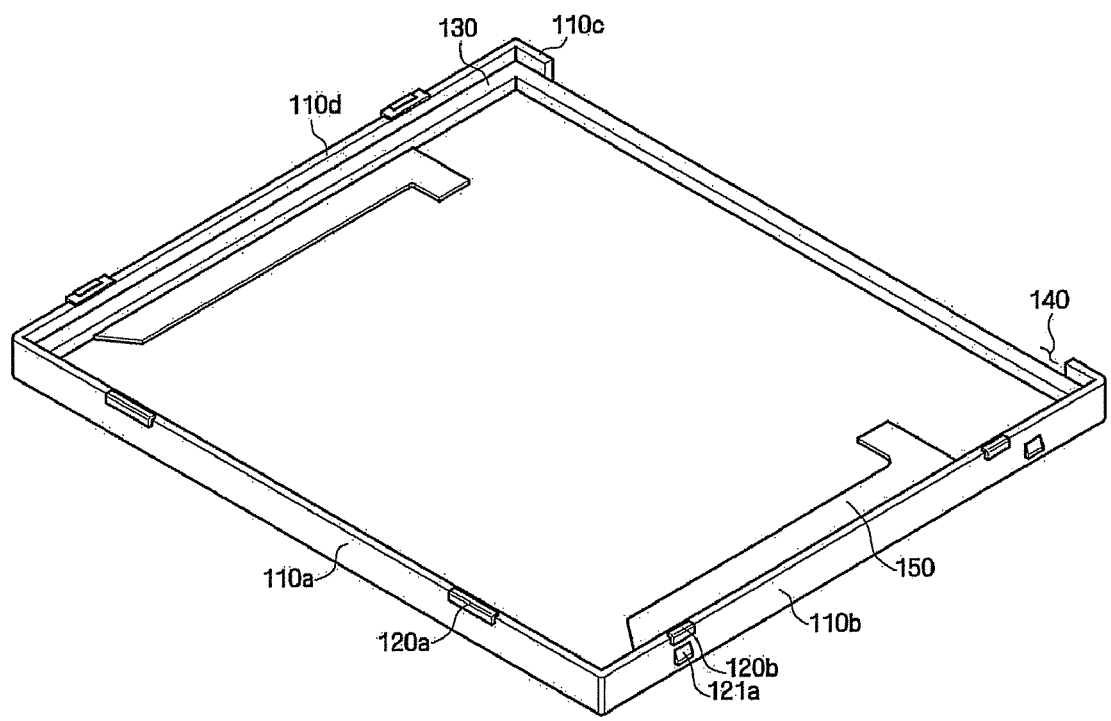
FIG. 4A is a perspective view showing an exemplary embodiment of the first frame included in the display apparatus shown in FIG. 1.
Figure 4B:
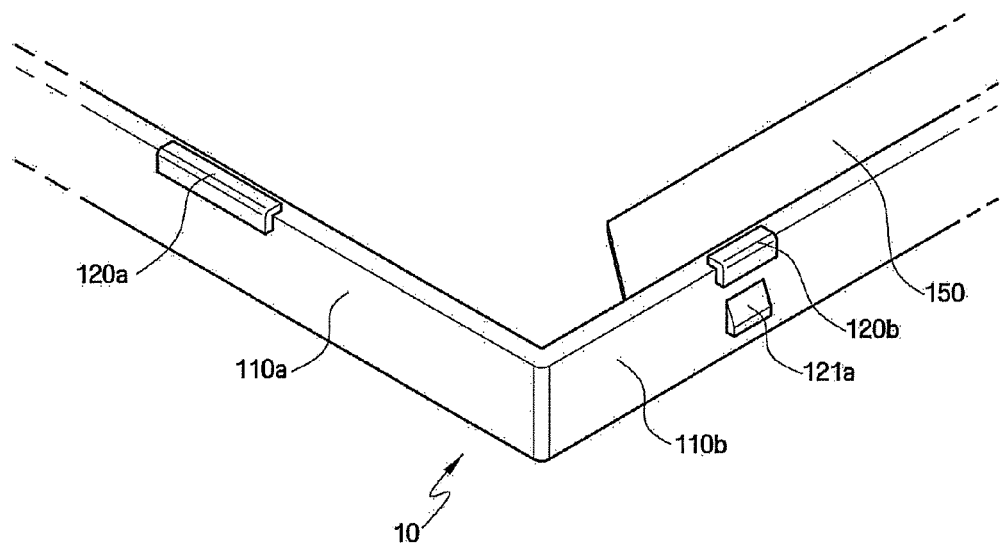
FIG. 4B is an enlarged perspective view showing an exemplary embodiment of the first frame shown in FIG. 3A.
Figure 5A:
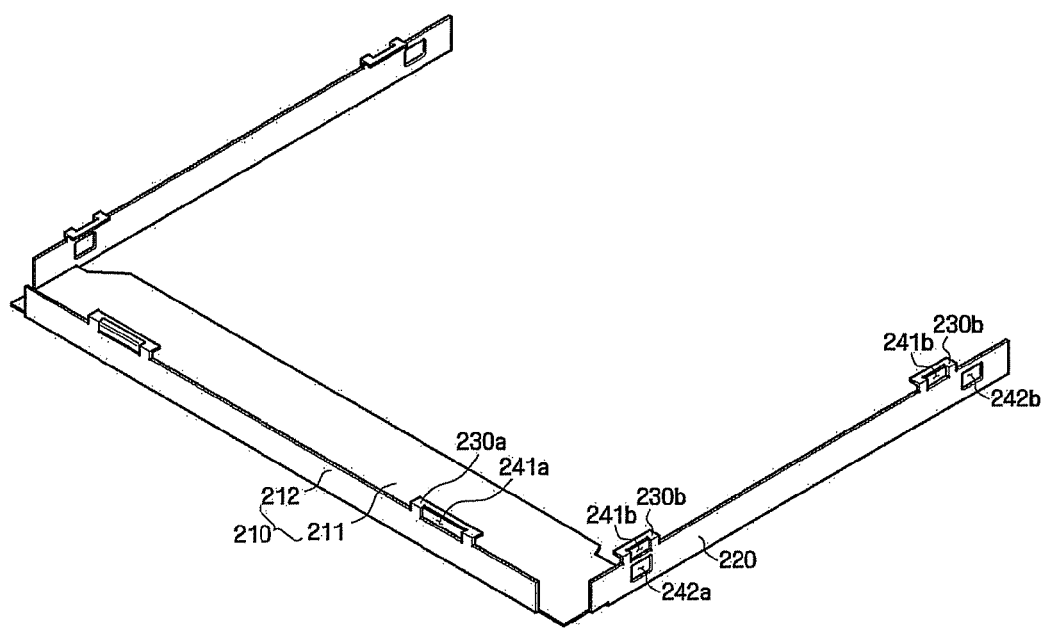
FIG. 5A is a perspective view showing an exemplary embodiment of the second frame included in the display apparatus shown in FIG. 1.
Figure 5B:
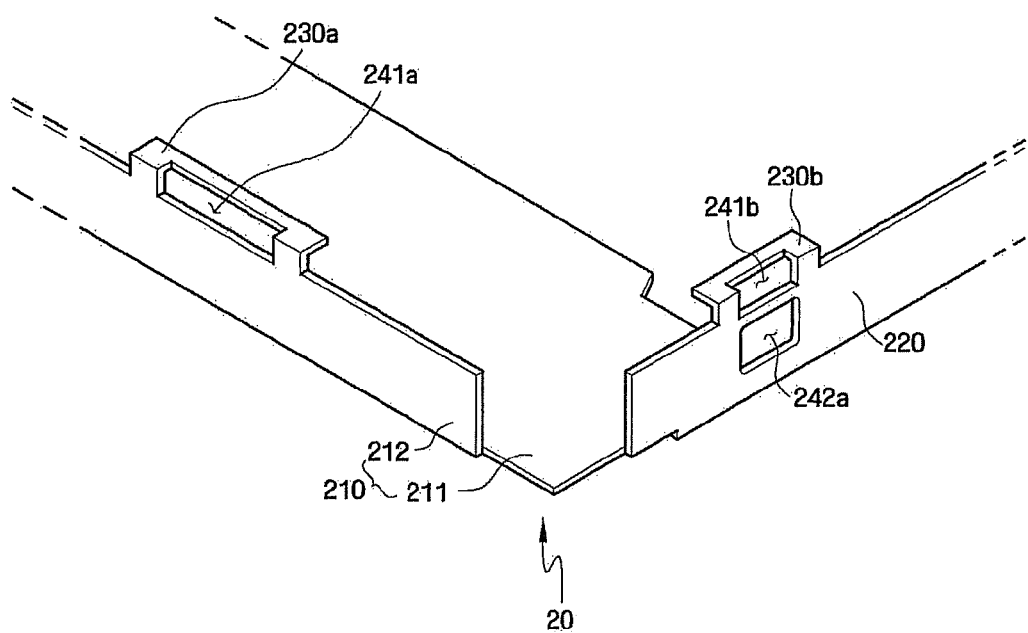
FIG. 5B is an enlarged perspective view showing an exemplary embodiment of the second frame shown in FIG. 3A.
Figure 6A:
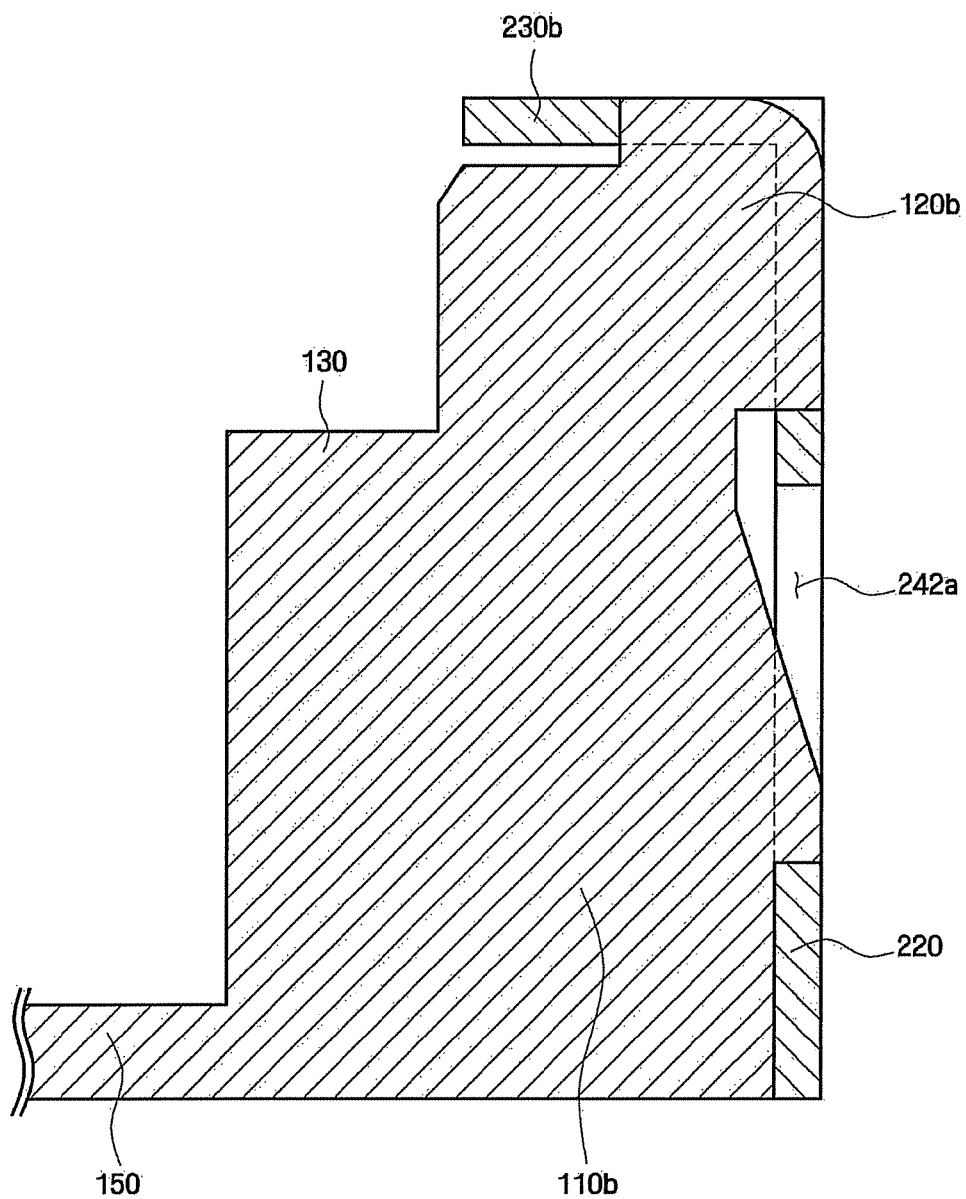
FIG. 6A is a sectional view showing an exemplary embodiment of the first frame and the second frame, taken along line A-A' in FIG. 2.

Hereinafter, a display apparatus according to a first embodiment will be described in further detail with reference to FIG. 1 to FIG. 6A. FIG. 1 is an exploded perspective view showing an exemplary embodiment of a display apparatus, FIG. 2 is a perspective view showing an exemplary embodiment of the coupling relationship between a first frame and a second frame included in the display apparatus shown in FIG. 1, FIG. 3A is an enlarged perspective view showing an exemplary embodiment of an "A" region shown in FIG. 2, FIG. 3B is an enlarged perspective view showing an exemplary embodiment of a "B" region shown in FIG. 2, FIG. 4A is a perspective view of the first frame included in the display apparatus shown in FIG. 1, FIG. 4B is an enlarged perspective view showing an exemplary embodiment of the first frame shown in FIG. 3A, FIG. 5A is a perspective view showing an exemplary embodiment of the second frame included in the display apparatus shown in FIG. 1, FIG. 5B is an enlarged perspective view showing an exemplary embodiment of the second frame shown in FIG. 3A, and FIG. 6A is a sectional view showing an exemplary embodiment of the first frame and the second frame, taken along line A-A' in FIG. 2.

Figure 2:
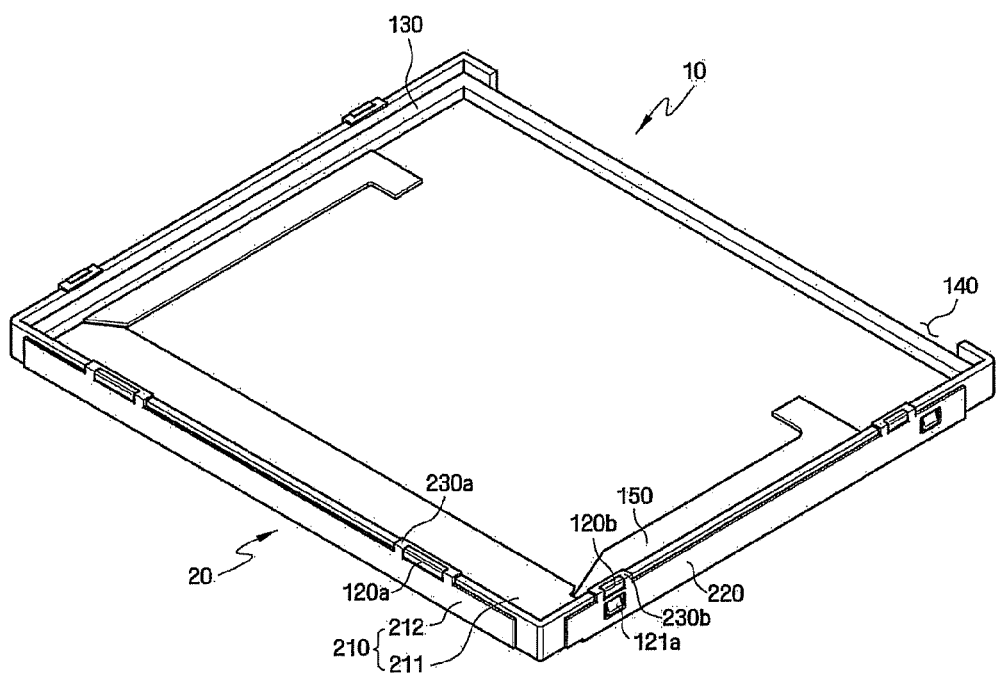
FIG. 2 is a perspective view showing an exemplary embodiment of the coupling relationship between a first frame and a second frame included in the display apparatus shown in FIG. 1.

Referring first to FIGS. 1 and 2, the display apparatus 1 according to the embodiment includes a display panel assembly and a backlight assembly.

The display panel assembly includes a display panel 30 comprising a lower substrate 31 and an upper substrate 32, liquid crystal (not shown), a flexible printed circuit board 33, and a printed circuit board 34.

The display panel 30 includes a lower substrate 31 and an upper substrate 32 opposite to the lower substrate 31. The lower substrate 31 includes a gate line (not shown), a data line (not shown), a thin film transistor ("TFT") array, and a pixel electrode, for example. The upper substrate 32 includes a color filter, a black matrix, and a common electrode, for example. Here, the color filter and the common electrode may be disposed on the lower substrate 31.

The flexible printed circuit board 33 is electrically connected to the gate line or the data line disposed on the lower substrate 31. The flexible printed circuit board 33 may include a wiring pattern disposed such that a semiconductor chip is disposed on a base, and bonded by a Tape Automated Bonding ("TAB") technique. Examples of such a chip film package include, but are not limited to, a tape carrier package ("TCP"), chip on film ("COF"), and the like.

In addition, various driving components for supplying the gate lines and the data lines with a gate driving signal and a data driving signal through the flexible printed circuit board 33 may be mounted on the printed circuit board 34.

The backlight assembly includes a first frame 10, an optical sheet 40, a light guide plate 50, a light source 55, a reflection sheet 60, and a second frame 20.

The light source 55 includes one or more lamps for emitting light. Exemplary lamps include a line light source, such as a cold cathode fluorescent lamp ("CCFL"), a hot cathode fluorescent lamp ("HCFL"), an external electrode fluorescent lamp ("EEFL"), or the like, or a point light source, such as a light emitting diode ("LED"), or the like, or a combination comprising at least one of the foregoing lamps. As is shown in FIG. 1, in an edge-type backlight assembly, at least one light source may be positioned at either side of the light guide plate 50. Thus the light source may be disposed at one side of the light guide plate 50, or the light source may be disposed at both sides of the light guide plate 50, for example.

The light guide plate 50 guides the light supplied from the light source 55 to the display panel 30. The light guide plate 50 may comprise a plastic panel, the plastic panel comprising a transparent material such as polymethyl methacrylate ("PMMA"), or the like. The light guide plate 60 makes the light emitted from the light source 55 travel toward the display panel 30, which is positioned over the light guide plate 50. Thus, various patterns for switching a traveling direction of the light incident upon the light guide plate 50 to the display panel 30 are printed on the bottom surface of the light guide plate 50.

The optical sheet 40, which is disposed on the light guide plate 50, diffuses and concentrates the light emitted from the light guide plate 50. The optical sheet 40 may include a diffusion sheet, a prism sheet, a protective sheet, or the like, or a combination comprising at least one of the foregoing sheets. Alternatively, the optical sheet 40 may be a combination sheet comprising all or some of the functions of these sheets. That is, the combination sheet may be constructed such that it has a diffusion capability at its bottom layer, a prism pattern (not shown) disposed on the bottom layer, and a protective layer disposed on the prism pattern. In such a manner, since the optical sheet 40 encompasses all of diffusive and prismatic functions in a single sheet, the number of components can be reduced, thereby making the display apparatus 1 slimmer.

The first frame 10 accommodates the optical sheet 40, the light guide plate 50, and the light source 55, and is combined to the second frame 20. The first frame 10 has a window disposed in its center to allow for transmittance of the light that has passed through the light guide plate 50 and the optical sheet 40.

The first frame 10 includes sidewalls 110a, 110b, 110c, and 110d, which form a rectangular frame that surrounds the lateral sides of the first frame 10, and a seating portion 130 inwardly extending from the sidewalls 110a, 110b, 110c, and 110d.

The first frame 10 may be disposed by injection molding, or the like.

The reflection sheet 60 is disposed under the light guide plate 50 and upwardly reflects the light emitted from below the light guide plate 50. The reflection sheet 60 disposed under the light guide plate 50 further reflects unreflected light, that is, the light that is not reflected by fine dot patterns disposed on the rear surface of the light guide plate 50, toward an exit face of the light guide plate 50, thereby reducing loss of light incident onto the display panel 30 and enhancing the uniformity of the light transmitted to the exit face of the light guiding plate 50.

The first frame 10 is disposed on and combined with the second frame 20. The second frame 20 accommodates the light source 55, and functions to reinforce the strength of the display apparatus 1. The second frame 20 includes a cover portion 210, which receives the light source 55, and a support portion 220, which supports the cover portion 210. The second frame 20 is disposed in a 'U' shape such that the support portion 220 extends from opposite ends of the cover portion 210.

Hereinafter, the first frame and the second frame will be described in further detail with reference to FIG. 1 to FIG. 6.

The first frame 10 and the second frame 20 are combined with each other to support the display panel 30, and accommodate the optical sheet 40, the light guide plate 50, the light source 55, and the reflection sheet 60, in an inner cavity portion of the first frame 10 and the second frame 20. The first frame 10 and the second frame 20 form a framework of the display apparatus 1 and protect various components in the internal cavity portion formed by the combination of the first frame 10 and the second frame 20.

In order to protect the components in the inner cavity portion, the first frame 10 can comprise a material having sufficient stiffness. The first frame 10 can comprise polycarbonate ("PC"), or a mixture of PC and acrylonitrile butadiene styrene ("ABS") copolymer resin, or the like. Also, to prevent light from leaking to the outside, the first frame 10 may comprise a non-transparent resin. In order to reduce the likelihood that the display panel 30 disposed on the first frame 10 is broken, the first frame 10 may comprise a ductile material.

The first frame 10 includes four sidewalls 110a, 110b, 110c, and 110d, which form a rectangular frame. The seating portion 130, which inwardly extends from the sidewalls 110a, 110b, 110c, and 110d to receive the display panel 30, may be disposed on at least one of the sidewalls 110a, 110b, 110c, and 110d. The seating portion 130 can be formed on the sidewalls 110a, 110b, 110c, and 110d of the first frame 10. The seating portion 130 may be disposed at an edge of the light guide plate 50. Thus, in an embodiment, the seating portion 130 is disposed on at least one of the sidewalls 110a, 110b, 110c, and 110d, and in another embodiment the seating portion 130 is disposed on the light guide plate 50.

The light source 55 may be positioned inside at least one of the sidewalls 110a, 110b, 110c, and 110d of the first frame 10. The light source 55 may also include a separate lamp cover (not shown), and an inner surface of the lamp cover may be coated with a reflective material. In an embodiment, wherein an edge type backlight assembly is included in the display apparatus 1 shown in FIG. 1, the light source 55 is disposed on at least one side of the light guide plate 50. Thus the display apparatus 1 can comprise a plurality of light sources 55.

An opening 140, through which the flexible printed circuit board 33 can penetrate, may be disposed on at least one of the sidewalls 110a, 110b, 110c, and 110d of the first frame 10. The opening 140 is disposed on the sidewall 110c of the first frame 10 and has a dimension that is greater than, or a dimension that is substantially the same as, those of the flexible printed circuit board 33. The sidewall 110c, which comprises the opening 140, has a height that is less than a height of the other sidewalls 110a, 110b, and 110d.

The opening 140 may be disposed along the sidewall 110c in the form of a groove. The flexible printed circuit board 33 is disposed through the opening 140, and electrical connection between the printed circuit board 34 and the flexible printed circuit board 33 may be accommodated in the bottom of the second frame 20.

The sidewalls 110a, 110b, 110c, and 110d of the first frame include first fastening protrusions 120a and 120b, and a second fastening protrusion 121a, to establish a hook coupling with the second frame 20. The first fastening protrusions 120a and 120b, and the second fastening protrusions 121a, are engaged with the first fastening grooves 241a and 241b, a second fastening groove 242a disposed in the second frame 20, respectively, to allow the first frame 10 and the second frame 20 to be combined with each other.

The first fastening protrusions 120a and 120b are disposed at an edge of the sidewalls 110a, 110b, and 110b. Alternatively, the first fastening protrusions 120a and 120b may upwardly protrude and be perpendicular to a surface of the display panel 30. The first fastening protrusions 120a and 120b may be disposed on the sidewalls 110a, 110b, and 110b, which are combined to the second frame 20, and thus in this embodiment are not disposed on the sidewall 110c, which is not combined with the second frame 20. The first fastening protrusions 120a and 120b may be disposed in the form of spots, or channels elongated along the sidewalls 110a, 110b, and 110b.

The second fastening protrusion 121a is disposed on an external surface of the sidewalls 110b and 110d, and are coupled to the second fastening groove 242a of the second frame 20. The second fastening protrusion 121a, and the second fastening groove 242a, serve to reinforce a coupling power between the first frame 10 and the second frame 20. When desired, in order to further reinforce the coupling power, screw engagement may be employed in place of, or in addition to, the second fastening protrusion 121a and the second fastening groove 242a.

In addition, a planar portion 150 may be disposed at a lower portion of the first frame 10. The planar portion 150 allows the optical sheet 40, the light guide plate 50, and the reflection sheet 60 to be securely accommodated within the first frame 10. The planar portion 150 has a width defined by an interior area formed by the sidewalls 110a, 110b, 110c, and 110d of the first frame 10. The planar portion 150 is disposed at the sidewalls 110b and 110d opposite to and facing each other, within the sidewalls 110a, 110b, 110c, and 110d of the first frame 10. The width of planar portion 150 can, if desired, have a width wide enough to receive the light guide plate 50 and the reflection sheet 60.

The second frame 20 is combined to the first frame 10 and serves to reinforce the strength of the first frame 10. The second frame 20 may comprise a metal material capable of reducing the volume of the second frame 20 while maintaining the strength thereof. The second frame 20 can be fabricated from a metal plate that is subjected to a sheet metal forming process, thereby forming a simplified structure for maintaining high strength. The first frame 10 may be combined with the second frame 20 by a hook coupling. The second frame 20 includes a cover portion 210 in which the light source 55 is accommodated, and a support portion 220 extending from the cover portion 210. The cover portion 210 protects the light source 55 accommodated therein and prevents light from being leaked to the outside from the light source 55. The cover portion 210 includes a cover bottom surface 211, forming a bottom surface of the cover portion 210, and a cover wall 212 extending from the cover bottom surface 211. The cover bottom surface 211 is disposed towards the bottom surface of the first frame 10 so as to partially overlap with the light guide plate 50. The cover wall 212 is bent along the external surface of the sidewall 110 of the first frame 10.

The support portion 220 is connected to opposite ends of the cover portion 210 and extends along the sidewalls 110b and 110d of the first frame 10. Thus the cover portion 210 and the support portion 220 are disposed in a 'U' shape. The support portion 220 extends along the external surfaces of the sidewalls 110b and 110d, and reinforces the strength of the first frame 10. The support portion 220 may be shorter than the sidewalls 110b and 110d, thus the support portion 220 may have a height that is less than an height of sidewalls 110b and 110d. The cover portion 210 and the support portion 220 may be integrally formed using a single metal plate.

In addition, the cover portion 210 and the support portion 220 include the first fastening grooves 241a and 241b, and the second fastening groove 242a. The first fastening protrusions 120a and 120b are inserted into the first fastening grooves 241a and 241b to establish a hook coupling, and the first fastening grooves 241a and 241b may be disposed at fixing members 230a, 230b, and 230c, and comprise bent ends of the cover portion 210 and the support portion 220. Thus the cover portion 210 and the support portion 220 are bent along the external surfaces of the sidewalls 110a, 110b, and 110b of the first frame 10, and the fixing members 230a and 230b are bent to the upper surface of the sidewalls 100a, 110b, and 110b. In this embodiment, the first fastening grooves 241a and 241b may be disposed at the edges of the fixing members 230a, 230b, and 230c. At least one of the fixing members 230a and 230b may be provided in the cover portion 210 and the support portion 220.

In order to fasten the display panel 30, the first frame 10, and the second frame 20, an adhesive member (not shown) may be used. Thus, in order to reduce the overall weight and thickness of the display apparatus 1, the display panel 30 and the first frame 10 may be directly attached to the second frame 20 while removing an accommodation member for fixing the display panel 30, the first frame 10, and the second frame 20. Therefore the overall strength of the display apparatus 1 can be maintained by the first frame 10 and the second frame 20, and the display apparatus 1 can be assembled in a simplified manner without a substantial change in the entire structure by directly attaching the display panel 30 to the first frame 10 and the second frame 20.

Hereinafter, a method of manufacturing the display apparatus 1 according to a first embodiment will be described.

First, the light source 55, the optical sheet 40, and the light guide plate 50 are disposed into the inner cavity portion formed by the sidewalls 110a, 110b, 110c, and 110d of the first frame 10. The light source 55, the optical sheet 40, and the light guide plate 50 are disposed in the seating portion 130 inwardly extending from the sidewalls 110b, 110c, and 110d.

In addition, the planar portion 150, extending at a lower portion of the sidewalls 110b and 110d, prevents the light guide plate 50 and the optical sheet 40 from deviating from a framework formed by the first frame 10 and the second frame 20, and the reflection sheet 60 may be disposed between the light guide plate 50 and the planar portion 150.

Next, the first frame 10 and the second frame 20 are combined with each other. The first fastening groove 241a disposed at the cover portion 210 of the second frame 20 is coupled to the first fastening protrusion 120a disposed at the edge of the sidewall 110a, among the sidewalls 110a, 110b, 110c, and 110d of the first frame 10. In such a manner, with regard to combining the first frame 10 with the second frame 20, the first fastening protrusions 120a and the first fastening grooves 241a are first coupled to each other by a hook coupling. Next, the first frame 10 and the second frame 20 are combined with each other such that they are rotated about the first fastening protrusion 120a and the first fastening groove 241a, and the sidewalls 110b and 110d are then coupled to the support portion 220 by the hook coupling. Next, the display panel 30 is disposed on the seating portion 130 of the first frame 10. In this embodiment, an adhesion member (not shown) may be disposed between the display panel 30 and the seating portion 130 for attaching the display panel 30 to the first frame 10. In this manner, it has been observed that assembly of the display apparatus 1 is simplified.

Figure 6B:
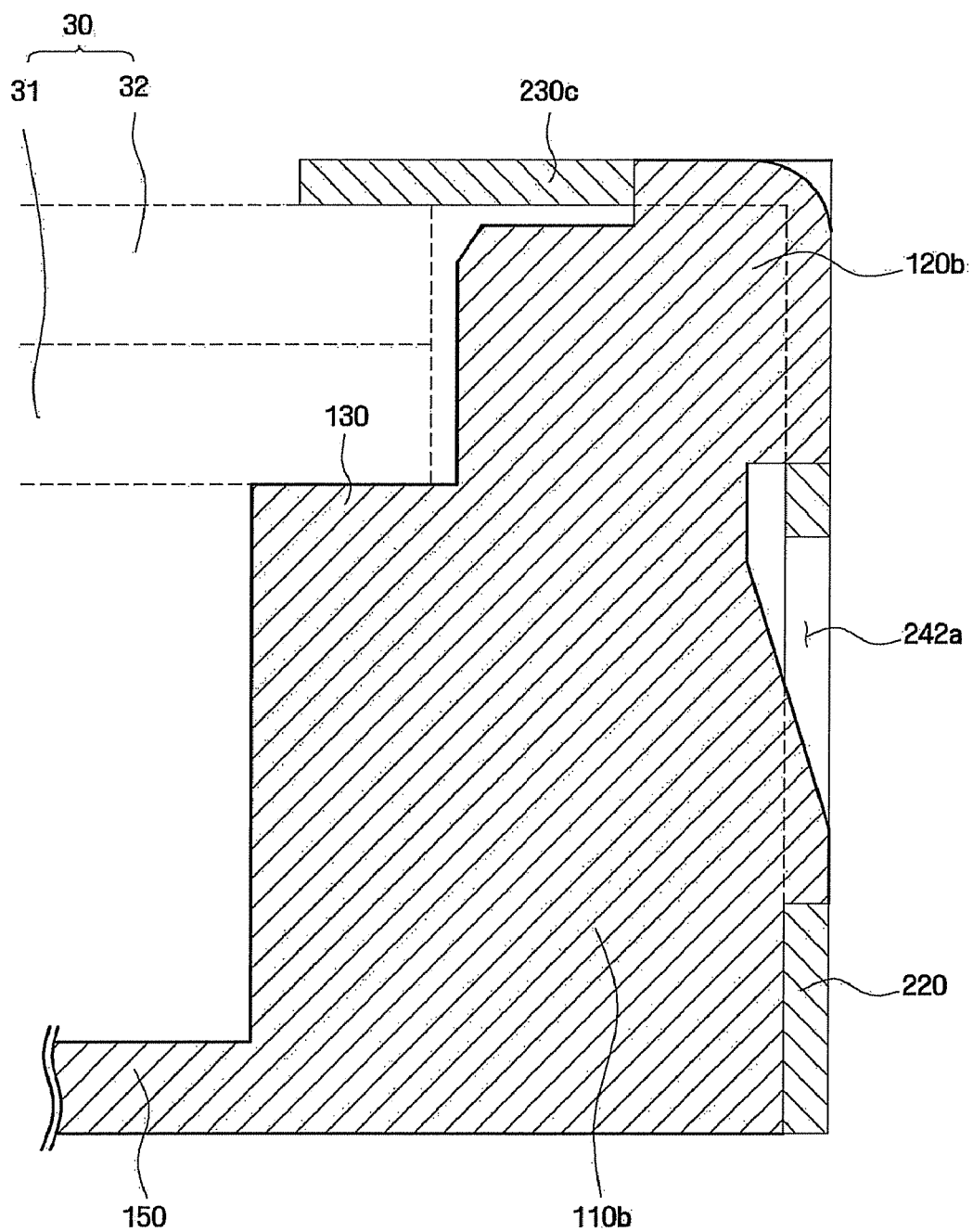
FIG. 6B is a sectional view illustrating an exemplary embodiment of a modified example of the second frame shown in FIG. 6A.

Hereinafter, a second embodiment of the second frame 20 shown in FIG. 6A will be described with FIGS. 1 and 6B. FIG. 6B is a sectional view illustrating a second embodiment comprising a modified second frame, as is shown in FIG. 6A.

A display apparatus according to a second embodiment, including a modified second frame of the second frame 20 shown in FIG. 6A, is substantially the same as the display apparatus 1 according to the first embodiment, except that fixing members 230b included in the second frame 20 partially overlap with the display panel 30 to fix the display panel 30. Accordingly, the same reference numerals will be used to refer to the same or like parts as those described in the first embodiment, and thus the detailed descriptions of the same elements will be omitted.

The fixing members 230b fasten the first frame 10 with the second frame 20, and prevent the display panel 30 from deviating from the first frame 10 and the second frame 20. Thus, the display panel 30 is fixed to the first frame 10 such that at least portions of the fixing members 230b are made to overlap with the display panel 30 by inwardly extending the first frame 10 by a predetermined length. Here, a width of each of the fixing members 230b may less than a width of the seating portion 130. In an embodiment using the fixing members 230b, a separate adhesion member may be omitted.

Figure 7:
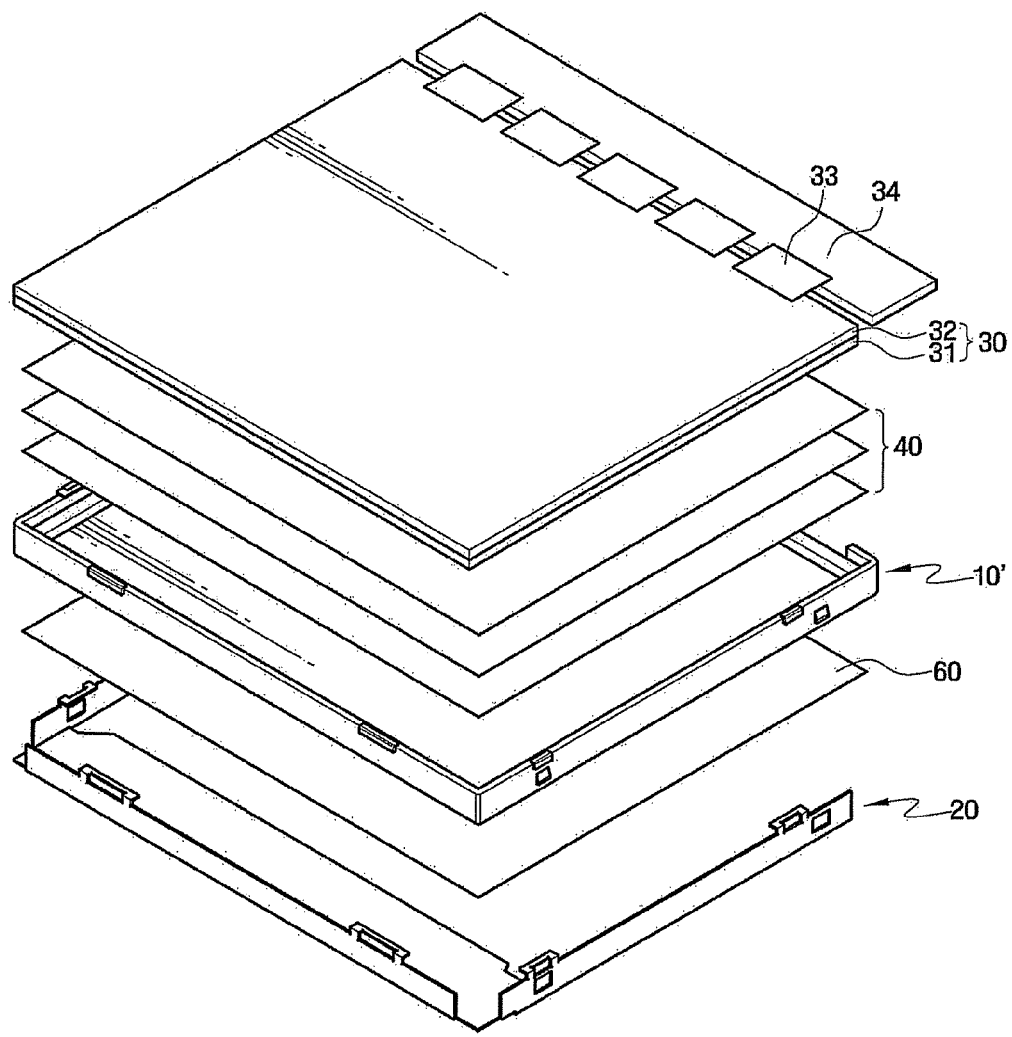
FIG. 7 is an exploded perspective view showing an exemplary embodiment of a display apparatus.
Figure 8A:
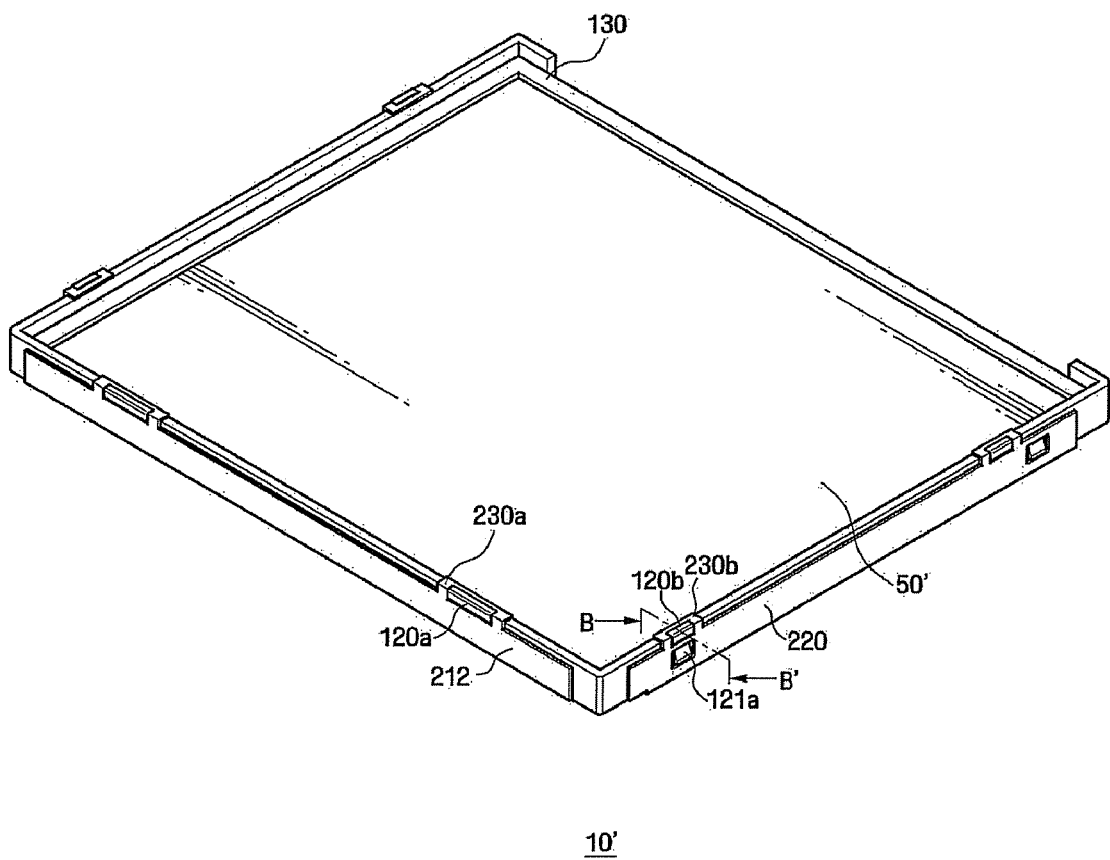
FIG. 8A is a perspective view showing an exemplary embodiment of the coupling relationship between a first frame and a second frame included in the display apparatus shown in FIG. 7.
Figure 8B:
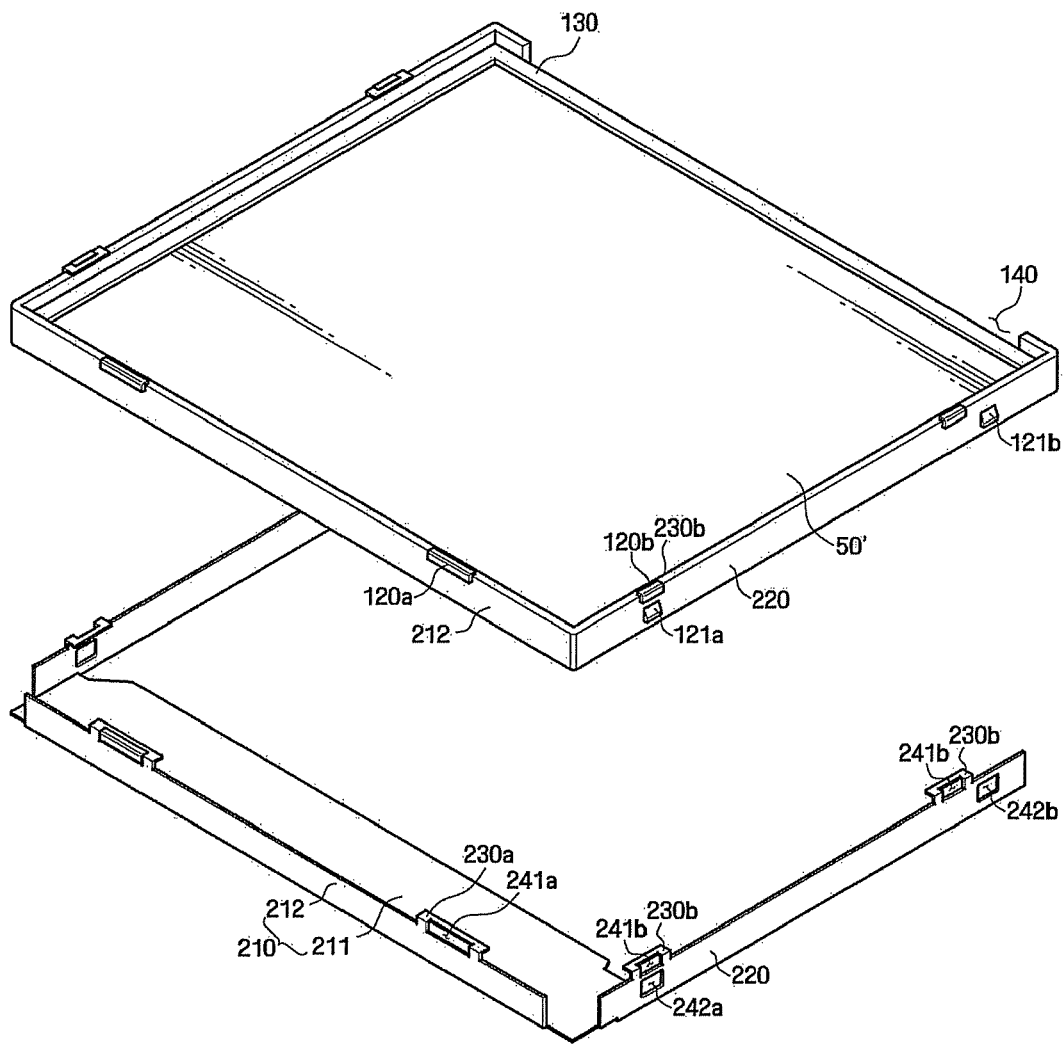
FIG. 8B is an exploded perspective view showing an exemplary embodiment of a first frame and a second frame shown in FIG. 8A.
Figure 9:
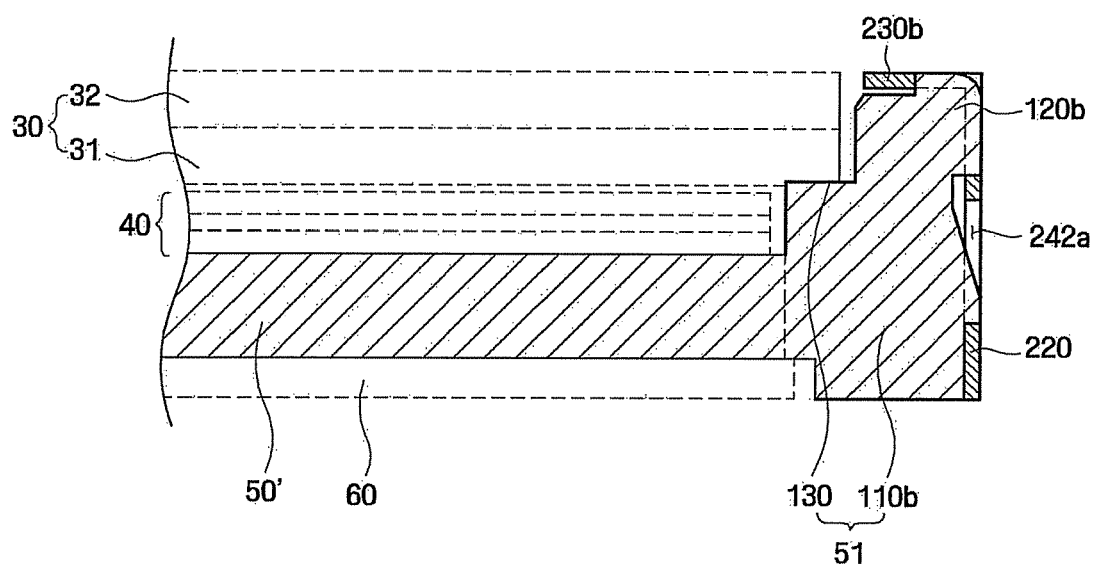
FIG. 9 is a sectional view showing an exemplary embodiment of the first frame and the second frame, taken along line B-B' in FIG. 2.

Hereinafter, a second embodiment of a display apparatus will be described in further detail with reference to FIGS. 7 to 9. FIG. 7 is an exploded perspective view showing an exemplary embodiment of a display apparatus, FIG. 8A is a perspective view showing an exemplary embodiment of the coupling relationship between a first frame and a second frame included in the display apparatus shown in FIG. 7, FIG. 8B is an exploded perspective view showing an exemplary embodiment of a first frame and a second frame shown in FIG. 8A, and FIG. 9 is a sectional view showing an exemplary embodiment of the first frame and the second frame, taken along line B-B' in FIG. 2.

The display apparatus according to a second embodiment, is substantially the same as the display apparatus 1 according to the first embodiment, except that a light guide plate and a first frame 10' are integrally disposed and a structure of the first frame 10' is modified. Accordingly, the same reference numerals will be used to refer to the same or like parts as those described in the first embodiment, and thus the detailed descriptions of the same elements will be omitted.

Referring first to FIG. 7, the display apparatus includes a display panel assembly, and a backlight assembly. The display panel assembly includes a display panel 30 comprising a lower substrate 31 and an upper substrate 32, a liquid crystal (not shown), a flexible printed circuit board 33, and a printed circuit board 34. The backlight assembly includes a first frame 10, an optical sheet 40, a light source 55, a reflection sheet 60, and a second frame 20.

The first frame 10' will now be described in further detail with reference to FIGS. 8A through 9. The first frame 10' includes a light guide portion 50', and a frame portion 51 forming a framework of the display apparatus.

The light guide portion 50' converts light having an optical distribution of a line light source, which is emitted from the light source 55, into light having the optical distribution of a surface light source. The light guide portion 50' comprises a resin having superior light transmittance, e.g., polymethymethacrylate ("PMMA"), or the like. The light guide portion 50' has substantially a rectangle or a square shape. In addition, a parallel surface flat plate, which has a constant thickness, or a wedge-type plate, which has a thickness gradually decreasing from one end to the other end, may be used as the light guide portion 50'. Further, in order to diffuse and reflect the incident light supplied from the light source 55, a prism pattern or a diffusion pattern may be disposed on the top or bottom surface of the light guide portion 50'.

The frame portion 51 is disposed along the edge of the light guide portion 50', and includes sidewalls 110a, 110b, 110c, and 110d forming external surfaces of the first frame 10', and a seating portion 130 disposed at an interior area formed by the sidewalls 110a, 110b, 110c, and 110d to receive the display panel 30. The frame portion 51 is integrally disposed with the light guide portion 50'. The light guide portion 50' and the frame portion 51 may be integrally disposed with each other by dual molding, insert molding, or the like.

Meanwhile, the light guide portion 50' and the frame portion 51 may comprise the same material or different materials. For example, the light guide portion 50' and the frame portion 51 may be integrally disposed using a single transparent resin, such as, PMMA, or the like, for example.

Alternatively, the first frame 10', which comprises the light guide portion 50' and the frame portion 51, may comprise different materials, that is, the light guide portion 50' may comprise a resin with light transmittance, e.g., PMMA, and the frame portion 51 may comprise a resin without light transmittance, e.g., polycarbonate ("PC"), or a mixture of PC and acrylonitrile butadiene styrene ("ABS") copolymer resin, or the like. When the first frame 10' is formed by integrally disposing the light guide portion 50' and the frame portion 51, the strength of the first frame 10' can be increased, thereby advantageously reducing the overall thickness and weight of the display apparatus. In addition, since the number of components is reduced and the assembly process is simplified, the manufacturing efficiency can be improved.

While the disclosed embodiments have been particularly shown and described with reference to exemplary embodiments thereof, it will be understood by those of ordinary skill in the art that various changes in form and details may be made therein without departing from the spirit and scope of the disclosure as defined by the following claims. It is therefore desired that the present embodiments be considered in all respects as illustrative and not restrictive, reference being made to the appended claims rather than the foregoing description to indicate the scope of the disclosure.

What is claimed is:

1. A display apparatus comprising:
   a display panel which displays an image;
   a light source which supplies light to the display panel;
   a first frame which supports the display panel, the first frame comprising a sidewall and comprising the light source disposed therein; and
   a second frame combined with the first frame,
   wherein the second frame includes a cover portion and a support portion, the cover portion receives the light source, and the support portion extends from the cover portion along the sidewall of the first frame, the cover portion is combined with the first frame, and the first frame comprises an opening disposed opposite to and facing the cover portion, the first frame further comprises a planar portion extending from the sidewall of the first frame to a lower portion of the display panel, the planar portion at least partially overlapping the display panel.

2. The display apparatus of claim 1, wherein the first frame is combined with the second frame by a hook coupling.

3. The display apparatus of claim 2, wherein the first frame further includes a fastening protrusion, and wherein the second frame further includes a fastening groove, the fastening groove coupled to the fastening protrusion and disposed on at least one of the cover portion and the support portion.

4. The display apparatus of claim 3, wherein the fastening protrusion is disposed at an edge of the sidewall, and the fastening groove is disposed at an edge of a fixing member, the fixing member comprises a bent end of the second frame.

5. The display apparatus of claim 4, wherein the fixing member partially overlaps the display panel.

6. The display apparatus of claim 1, further comprising a light guide plate disposed between the planar portion and the display panel, the light guide plate guides the light emitted from the light source.

7. The display apparatus of claim 6, further comprising a reflection sheet between the light guide plate and the planar portion, the reflection sheet reflects the light.

8. The display apparatus of claim 1, wherein the support portion is shorter than the sidewall of the first frame.

9. The display apparatus of claim 1, wherein the first frame includes a frame portion in which the display panel is disposed at an edge of the first frame, and a light guide portion that is integrally disposed with the frame portion as a single unitary indivisible part, the light guide portion guiding the light emitted from the light source to the display panel.

10. The display apparatus of claim 1, further comprising:
    a flexible printed circuit board connected to the display panel, the flexible printed circuit board having a dimension and the flexible printed circuit board applying various signals to the display panel;
    wherein the opening defined by the sidewall has a width corresponding to a width of the flexible printed circuit board, wherein a height of the opening disposed at the sidewall of the first frame corresponding to the flexible printed circuit board is less than a height of other sidewalls.

11. The display apparatus of claim 1, further comprising an adhesion member for attaching at least one of the first and second frames to the display panel.

12. A method of manufacturing a display apparatus, the method comprising:
    receiving a light source in a first frame; and
    combining a second frame with the first frame, the second frame including a cover portion which receives the light source and a support portion, the support portion protruding from the cover portion along a sidewall of the first frame and combined with the first frame, the first frame comprising an opening, the opening disposed opposite to and facing the cover portion,
    wherein the first frame is combined with the second frame by a hook coupling and the first frame further includes a fastening protrusion disposed at an edge of the sidewall, and the second frame further includes a fastening groove disposed at the cover portion, the fastening groove coupled to the fastening protrusion; and wherein the first frame and the second frame are combined with each other such that the fastening protrusion and the fastening groove are first coupled to each other by the hook coupling, and are rotated about the fastening protrusion and the fastening groove, thereby combining the support portion and the first frame.

* * * * *